(12) United States Patent
Lee et al.

(10) Patent No.: US 12,177,755 B2
(45) Date of Patent: Dec. 24, 2024

(54) BLE COMMUNICATION MODULE AND UNMANNED MOVING OBJECT SUPPORTING DYNAMIC MULTI-LINK TO CONFIGURE WIRELESS AD HOC NETWORK, AND METHOD THEREOF

(71) Applicant: ELECTRONICS AND TELECOMMUNICATIONS RESEARCH INSTITUTE, Daejeon (KR)

(72) Inventors: Sang Yeoun Lee, Daejeon (KR); Myung Eun Kim, Daejeon (KR); Ji Hun Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 388 days.

(21) Appl. No.: 17/564,470

(22) Filed: Dec. 29, 2021

(65) Prior Publication Data

US 2022/0225069 A1   Jul. 14, 2022

(30) Foreign Application Priority Data

Jan. 8, 2021   (KR) .................. 10-2021-0002714

(51) Int. Cl.
*H04W 4/80* (2018.01)
*H04W 4/12* (2009.01)
(Continued)

(52) U.S. Cl.
CPC ............... *H04W 4/80* (2018.02); *H04W 4/12* (2013.01); *H04W 4/23* (2018.02); *H04W 76/15* (2018.02); *H04W 84/18* (2013.01)

(58) Field of Classification Search
CPC ......... H04W 4/80; H04W 4/23; H04W 76/15; H04W 76/10; H04W 84/18; H04W 4/12
See application file for complete search history.

(56) References Cited

U.S. PATENT DOCUMENTS 7,336,645 B2   2/2008  Hur et al.
8,321,913 B2  11/2012  Turnbull et al.
(Continued)

FOREIGN PATENT DOCUMENTS

KR       2003-0084555 A    11/2003
KR    10-2017-0022001 A     3/2017
(Continued)

OTHER PUBLICATIONS

Sang-Yeoun Lee et al., "Implementation of BLE Multi-Link for Group Communication between Unmanned Vehicles", The Journal of Korean Institute of Communications and Information Sciences Feb. 2020 vol. 45 No. 02.

*Primary Examiner* — Jungwon Chang
(74) *Attorney, Agent, or Firm* — LRK PATENT LAW FIRM

(57) ABSTRACT

Provided is a Bluetooth Low Energy (BLE) communication module that supports a dynamic multi-link to configure a wireless ad hoc network. The BLE communication module includes a master configured to scan an advertising message transmitted from a slave of another BLE communication module and a slave connected to the master through an internal interface and configured to receive a scan message transmitted from a master of the other BLE communication module and transmit an advertising message corresponding to the scan message. Each of the master and the slave has a predetermined multi-port and a routing table for processing transmitted or received data.

13 Claims, 9 Drawing Sheets

(51) Int. Cl.
    *H04W 4/23*     (2018.01)
    *H04W 76/15*     (2018.01)
    *H04W 84/18*     (2009.01)

(56) References Cited

U.S. PATENT DOCUMENTS

| | | |
|---|---|---|
| 9,445,220 B2 | 9/2016 | Granbery |
| 9,571,957 B2 | 2/2017 | Granbery |
| 10,499,224 B2 | 12/2019 | Griffin |
| 2013/0036246 A1* | 2/2013 | Lunadier ............. G06F 13/1605 |
| | | 710/110 |
| 2017/0104834 A1* | 4/2017 | Huang .................. H04L 67/125 |
| 2018/0270643 A1 | 9/2018 | Baker et al. |
| 2019/0095687 A1* | 3/2019 | Shaw .................... A61B 5/0046 |
| 2019/0253323 A1* | 8/2019 | Mohr ..................... H04L 41/12 |
| 2019/0369613 A1* | 12/2019 | Moon ..................... G05D 1/101 |
| 2021/0058267 A1* | 2/2021 | Prest ....................... H04L 12/40 |
| 2021/0088337 A1* | 3/2021 | Koubaa .................. G01C 21/20 |
| 2021/0356279 A1* | 11/2021 | Szigeti ............... G01C 21/3407 |
| 2022/0060872 A1* | 2/2022 | Liu ....................... H04W 76/10 |
| 2022/0103998 A1* | 3/2022 | Chen ..................... H04M 15/93 |
| 2023/0353221 A1* | 11/2023 | Djordjevic ........... H04B 17/318 |

FOREIGN PATENT DOCUMENTS

| | | |
|---|---|---|
| KR | 10-1714653 B1 | 3/2017 |
| KR | 10-2017-0056807 A | 5/2017 |
| KR | 10-1899932 B1 | 11/2018 |
| KR | 10-2018-0128302 A | 12/2018 |
| KR | 10-2019-0122325 A | 10/2019 |
| KR | 10-2098156 B1 | 4/2020 |
| WO | 2016/167541 A1 | 10/2016 |

\* cited by examiner

BLE COMMUNICATION MODULE AND UNMANNED MOVING OBJECT SUPPORTING DYNAMIC MULTI-LINK TO CONFIGURE WIRELESS AD HOC NETWORK, AND METHOD THEREOF

CROSS-REFERENCE TO RELATED APPLICATION

This application claims priority to and the benefit of Korean Patent Application No. 2021-0002714, filed on Jan. 8, 2021, the disclosure of which is incorporated herein by reference in its entirety.

BACKGROUND

1. Field of the Invention

The present invention relates to a Bluetooth Low Energy (BLE) communication module and an unmanned moving object that support a dynamic multi-link to configure a wireless ad hoc network, and a method therefor.

2. Description of Related Art

Unmanned moving objects can be remotely controlled and are being applied in various fields such as industrial and private sectors. Recently, unmanned moving objects equipped with various sensor devices such as a global positioning system (GPS) unit, a camera, a LiDAR unit, a radar unit, and an altimeter and unmanned moving objects equipped with high-performance processors have been released. These unmanned moving objects are used for lifesaving in disaster situations, reconnaissance in the military field, etc.

Meanwhile, unmanned moving objects support only wireless communication with ground control systems to transmit image information between a waypoint and a destination and do not currently support communication with other unmanned moving objects and communication with other Internet-of-Things (IoT) devices.

SUMMARY OF THE INVENTION

The present invention is directed to providing a Bluetooth Low Energy (BLE) communication module, which supports a multi-link to configure a dynamic wireless ad hoc network due to the movement of a wireless vehicle in an environment in which it is difficult to install communication infrastructure or there is no communication infrastructure because of disasters such as fire, the wireless vehicle, and a method therefor.

However, objects to be achieved by the present embodiment are not limited to the above-mentioned object, and other objects may be present.

According to a first aspect of the present invention, there is provided a Bluetooth Low Energy (BLE) communication module supporting a dynamic multi-link to configure a wireless ad hoc network, the BLE communication module including a master configured to scan an advertising message transmitted from a slave of another BLE communication module and a slave connected to the master through an internal interface and configured to receive a scan message transmitted from a master of the other BLE communication module and transmit an advertising message corresponding to the scan message. In this case, each of the master and the slave has a predetermined multi-port and a routing table for processing transmitted or received data.

Also, according to a second aspect of the present invention, there is provided an unmanned moving object supporting a dynamic multi-link to configure a wireless ad hoc network, the unmanned moving object including a Bluetooth Low Energy (BLE) communication module including a master and a slave each having a predetermined multi-port and a routing table for processing transmitted or received data. The master scans an advertising message transmitted from a slave of another BLE communication module, and the slave is connected to the master through an internal interface and configured to receive a scan message transmitted from a master of the other BLE communication module and transmit an advertising message corresponding to the scan message.

Also, according to a third aspect of the present invention, there is provided a method of configuring a wireless ad hoc network through a Bluetooth Low Energy (BLE) communication module that supports a dynamic multi-link and includes a master and a slave, the method including allowing the master to scan an advertising message transmitted from a slave of another BLE communication module, allowing the master to connect one other BLE communication module to each port on the basis of ID information included in the advertising message, allowing the master to register ID information corresponding to the other BLE communication module in an integrated management unit when the other BLE communication module is connected to a specific port, and transmitting ID information of the BLE communication module corresponding to the master to the other BLE communication module and registering the ID information in the integrated management unit. In this case, each of the master and the slave has a predetermined multi-port and a routing table for processing transmitted or received data.

According to another aspect of the present invention, there is provided a computer program that is combined with a computer, which is hardware, to execute the method of configuring a wireless ad hoc network and that is stored in a computer-readable recording medium.

Other specific details of the present invention are included in the detailed description and drawings.

DETAILED DESCRIPTION OF EXEMPLARY EMBODIMENTS

Figure 1:
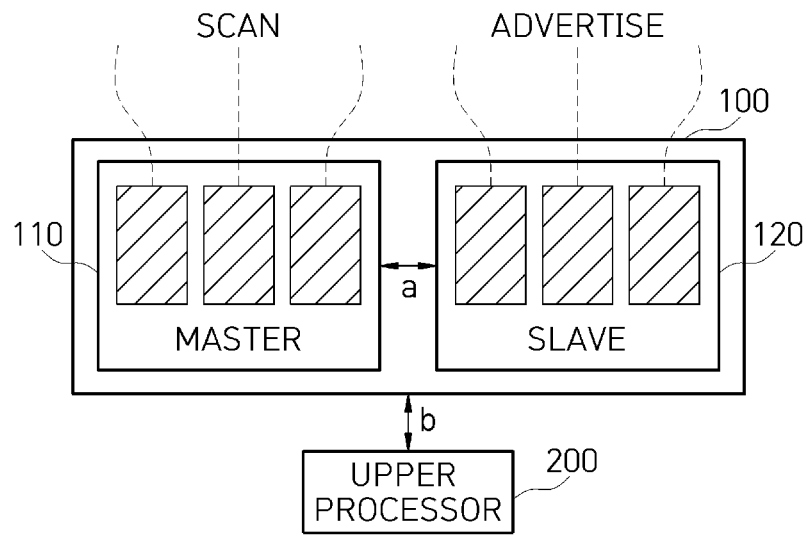
FIG. 1 is a diagram illustrating a Bluetooth Low Energy (BLE) communication module according to an embodiment of the present invention.

Advantages and features of the present invention and implementation methods thereof will be clarified through the following embodiments described in detail with reference to the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements but do not preclude the presence or addition of one or more other elements. Like reference numerals refer to like elements throughout the specification, and the term "and/or" includes any and all combinations of one or more of the associated listed items. It will be also understood that, although the terms first, second, etc. may be used herein to describe various elements, these elements should not be limited by these terms. These terms are only used to distinguish one element from another. Thus, a first element could be termed a second element without departing from the technical spirit of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to a Bluetooth Low Energy (BLE) communication module 100 and an unmanned moving object that support a dynamic multi-link to construct a wireless ad hoc network, and a method therefor. The present invention relates to a BLE communication module 100 that supports a multi-link function and an unmanned moving object equipped with the BLE communication module 100.

Various technologies, such as Bluetooth, Wi-Fi, satellite communication, cellular system, Long Term Evolution (LTE) and 5G LTE, are being introduced as wireless communication methods between an unmanned moving object and a ground control system to remotely control the unmanned moving object or obtain image information. Currently, Wi-Fi, satellite communication, and LTE are mainly being applied.

There are proposals for heterogeneous wireless ad hoc networks for constructing a communication network between unmanned moving objects as well as wireless communication between an unmanned moving object and a ground control system. An embodiment of the present invention provides a BLE communication module 100 capable of constructing a dynamic ad hoc network that is between unmanned moving objects or between an unmanned moving object and a nearby device and that is freely movable in an environment lacking in communication infrastructure, and an unmanned moving object equipped with the BLE communication module 100.

The present invention provides a BLE communication module 100 having both of a master function and a slave function having a BLE-based multi-link to construct a dynamic wireless ad hoc network.

The BLE communication module 100 that supports a dynamic multi-link to construct a wireless ad hoc network according to an embodiment of the present invention (hereinafter referred to as a BLE communication module) will be described below with reference to FIGS. 1 to 9.

FIG. 1 is a diagram illustrating the BLE communication module 100 according to an embodiment of the present invention.

The BLE communication module 100 according to an embodiment of the present invention includes a master 110 and a slave 120. Each of the master 110 and the slave 120 may have a predetermined processor that provides a respective function.

The master 110 performs scanning to receive an advertising message transmitted from the slave of another BLE communication module.

The slave 120 receives a scan message transmitted from the master of another BLE communication module and transmits an advertising message corresponding to the scan message.

In an embodiment, when the slave 120 receives a scan message transmitted from the master of another BLE communication module, the slave 120 may transmit an advertising message including a name and ID information of the BLE communication module 100 of the slave 120.

The master 110 and the slave 120 are connected to each other through an internal interface (a). In an embodiment, the master 110 and the slave 120 may be connected to each other through an internal interface (a) such as an Inter-Integrated Circuit (I2C) or a Serial Peripheral Interface (SPI) to exchange data on the basis of a target ID.

The master 110 and the slave 120 each use an external antenna. In an embodiment, the antennas may be provided to correspond to the master 110 and the slave 120. The master 110 and the slave 120 may be connected to an upper processor 200 through a predetermined interface (b). As an example, the master 110 and the slave 120 may be connected to each other through an interface (b) such as a universal asynchronous receiver-transmitter (UART). At this time, the predetermined interface (b) may be located in the master 110 or the slave 120. In the present invention, as an example, it will be described that the master 110 is connected to the upper processor 200 through a UART interface.

Figure 2:
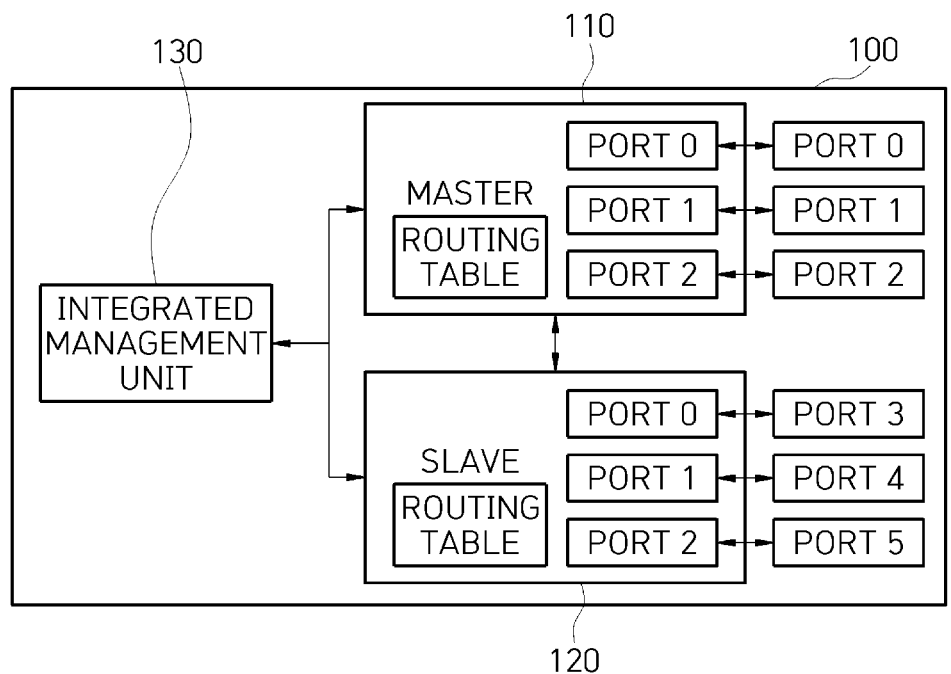
FIG. 2 is a diagram illustrating a multi-port in a BLE communication module according to an embodiment of the present invention.

FIG. 2 is a diagram illustrating a multi-port in a BLE communication module 100 according to an embodiment of the present invention.

In an embodiment of the present invention, each of the master 110 and the slave 120 may include a predetermined multi-port.

In an example of FIG. 2, the master 110 and the slave 120 include three multi-ports. An integrated management unit 130 controls a connection to another BLE communication module through the multi-ports of the master 110 and the slave 120 on the basis of a single ID.

The integrated management unit 130 may match the multi-ports corresponding to the master 110 and the slave 120 to one virtual multi-port and output the matching result to another BLE communication module and a higher-level application.

For example, the integrated management unit 130 matches port 0 to port 2 of the master 110 and port 0 to port 2 of the slave 120 to virtual ports 0 to 5, and the higher-level application or other BLE communication module checks only the connection of the BLE communication module 100 having six ports (port 0 to port 5) regardless of the master 110 and the slave 120.

Meanwhile, the integrated management unit 130 may be provided in any one of the master 110, the slave 120, and a separate processor (not shown).

Also, each of the master 110 and the slave 120 may have a routing table for processing transmitted or received data.

When receiving data with a source ID corresponding to a first BLE communication module that is not directly connected to any one of the multi-ports, the master 110 and the slave 120 register the source ID of the first BLE communication module and the corresponding port in the routing table. Then, the master 110 and the slave 120 may sequentially search for an ID of a second BLE communication module corresponding to a target ID and search the routing table whenever data is input and then may transmit the data.

Here, the first BLE communication module is a BLE communication module that is not connected to the ports of the master 110 and the slave 120. Also, the second BLE communication module is directly connected to one of the multi-ports of the master 110 or the slave 120 and corresponds to another BLE communication module that is directly connected to the first BLE communication module.

Figure 3:
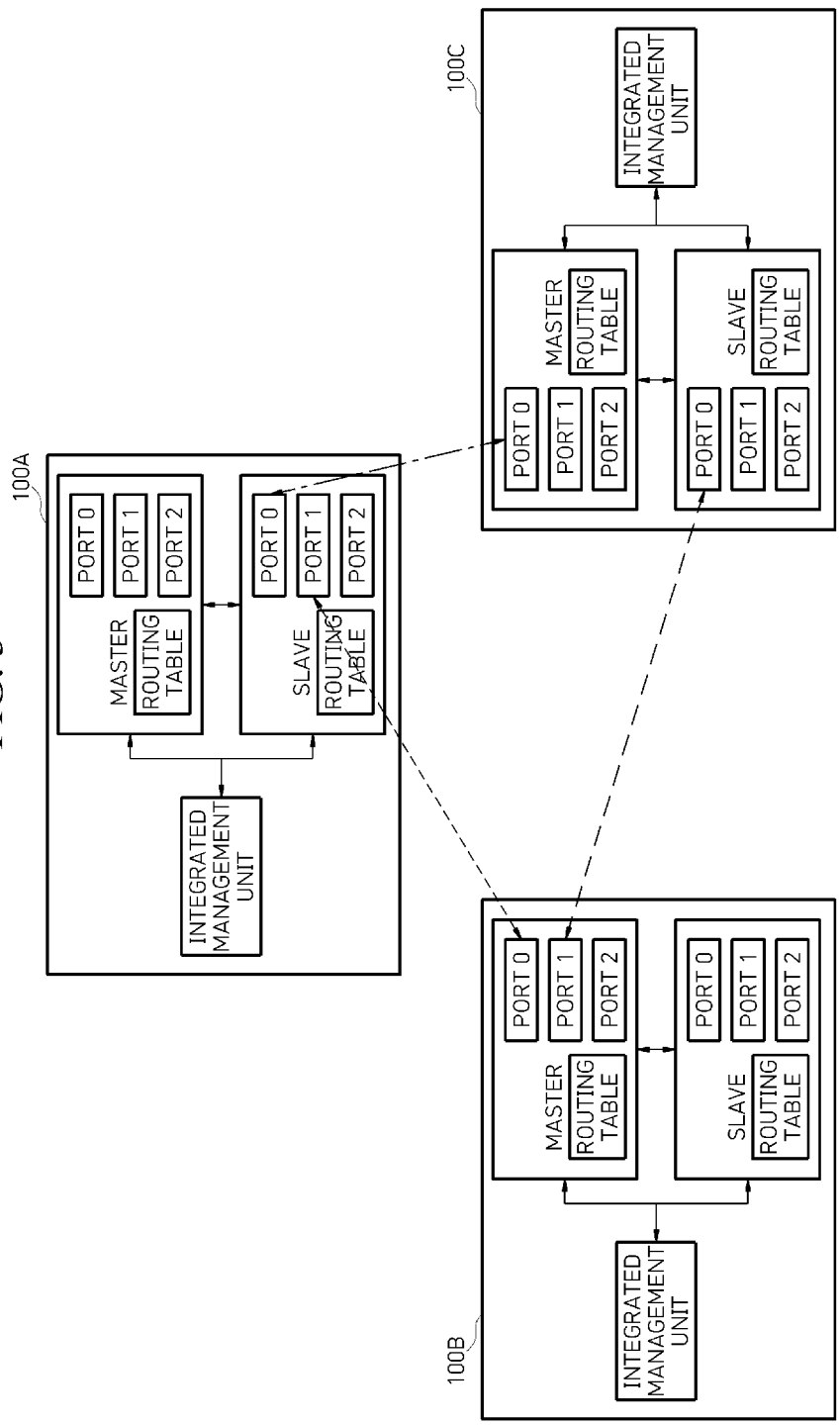
FIG. 3 is a diagram illustrating an example of managing a multi-port in a BLE communication module.

FIG. 3 is a diagram illustrating an example of managing a multi-port in a BLE communication module 100.

As described above, the slave 120 adds ID information of the BLE communication module 100 to an advertising message and transmits the ID information through a beacon. The master of another BLE communication module 100B or 100C checks the ID information transmitted from the slave 120 to determine whether the ID is the same as the ID of the other BLE communication module or an already connected redundant ID, and allows only one BLE communication module to be connected per port.

Likewise, when receiving an advertising message of the other BLE communication modules 100A and 100C through a scanning process, the master 110 performs management based on the ID information included in the advertising message so that only one other BLE communication module remains connected per port.

As the connection of another BLE communication module to a specific port is completed, the master 110 registers ID information corresponding to the other BLE communication module in the integrated management unit 130. Also, the master 110 transmits the ID information corresponding to the BLE communication module 100 of the master 110 to the slave of the other BLE communication module to register the ID information in the integrated management unit of the other BLE communication module.

When the connections of several BLE communication modules are made for the same ID, the master 110 and the slave 120 may determine whether to maintain or terminate the redundant connection of the BLE communication module through integrated management unit 130 on the basis of the registered ID.

This is to prevent the same BLE communication module from being redundantly connected using a plurality of ports because the BLE communication module is configured based on a multi-port.

That is, when the same other BLE communication module is connected to a plurality of ports included in the master 110 or the slave 120, the master 110 or the slave 120 allows a BLE communication module with a higher priority based on ID information to be connected through only one port among redundantly connected ports and determines to terminate the other port connections. At this time, a BLE communication module with a lower priority waits for the connection of the BLE communication module with the high priority so that only one BLE communication module remains connected per port.

As an example, when the first BLE communication module and the second BLE communication module are redundantly connected through port 0 and port 1, respectively, one of the first and second BLE communication modules having a higher priority is interconnected through only one of the redundantly connected ports, and the other ports are disconnected.

As described above, an embodiment of the present invention allows one BLE communication module to be connected to one port.

According to an embodiment of the present invention, through this function of the integrated management unit 130, it is possible to construct a dynamic ad hoc network by allowing only one BLE communication module among BLE communication modules to remain connected per port and allowing the connection to another BLE communication module or an Internet-of-Things (IoT) device to be performed through an empty port.

Figure 4:
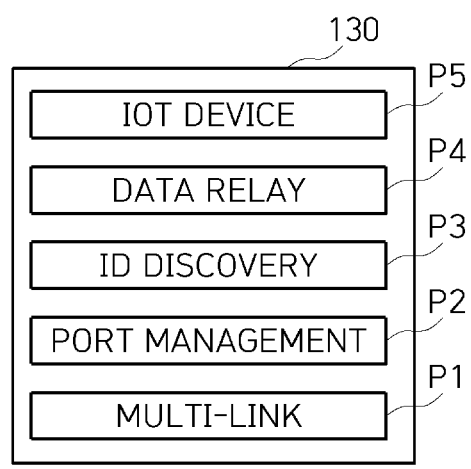
FIG. 4 is a diagram illustrating a function of an integrated management unit.

FIG. 4 is a diagram illustrating a function of an integrated management unit 130.

The integrated management unit may perform a multi-link function P1, a port management function P2, an ID discovery function P3, a data relay function P4, and an IoT device connection function P5.

First, the multi-link function P1 allows the master 110 and the slave 120 to support multiple links and allows an higher-level application to recognize the BLE communication module 100 as one communication module having several ports by performing integrated management of the master 110 and the slave 120 using a single ID.

The port management function P2 compares a new ID to an already connected ID when the other BLE communication module is connected per port. The same number of BLE connections as that of multi-link ports are managed by removing the connection of the new BLE communication module when a result of the comparison is that the new ID is its own ID or a redundant ID in order to perform maintenance and management so that one BLE communication module is connected per port.

The ID discovery function P3 is a function of finding an ID of a BLE communication module that is not directly connected through a wireless ad hoc network. In the ID discovery function, the master 110 and the slave 120 directly broadcast ID information for discovering a first BLE communication module that is not connected. Accordingly, when receiving a corresponding response message from the first BLE communication module having the corresponding ID information, the master 110 and the slave 120 update the routing table on the basis of the source ID and the receiving port of the response message. At this time, not only the first BLE communication module, which performs first transmission, but also the second BLE communication module, which is an intermediate stop, updates the routing table.

The data relay function P4 is a function of checking the routing table and performing transmission to a destination BLE communication module when the target ID is not directly connected between BLE communication modules.

Finally, the IoT device function P5 includes a function of supporting connection to various IoT devices 300 (e.g., a smartphone, a sensor device, etc.) that support BLE communication and processing data processed by only the BLE communication module 100, such as a control message, instead of the IoT device 300 and also a function of transmitting and receiving data.

Figure 5:
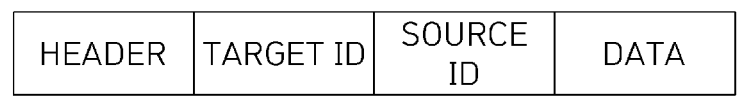
FIG. 5 is a diagram showing a data format between BLE communication modules.

FIG. 5 is a diagram showing a data format between BLE communication modules 100.

Data for the BLE communication module 100 includes a header, a target ID, a source ID, and a data field as shown in FIG. 5.

The BLE communication module 100 may check the target ID of transmitted or received data to check whether the target ID is the ID of the BLE communication module 100. When the ID is the ID of the BLE communication module 100, the BLE communication module 100 transmits the data to an upper processor 200. When the target ID is not the ID of the BLE communication module 100, the BLE communication module 100 searches for IDs connected to a multi-port. When there is no search result, the BLE communication module 100 transmits the data to a corresponding port on the basis of a separate result of searching a routing table. When there is no separate information in the routing table, the corresponding data is discarded.

Examples of a wireless ad hoc network structure according to an embodiment of the present invention will be described below with reference to the drawings.

Figure 6:
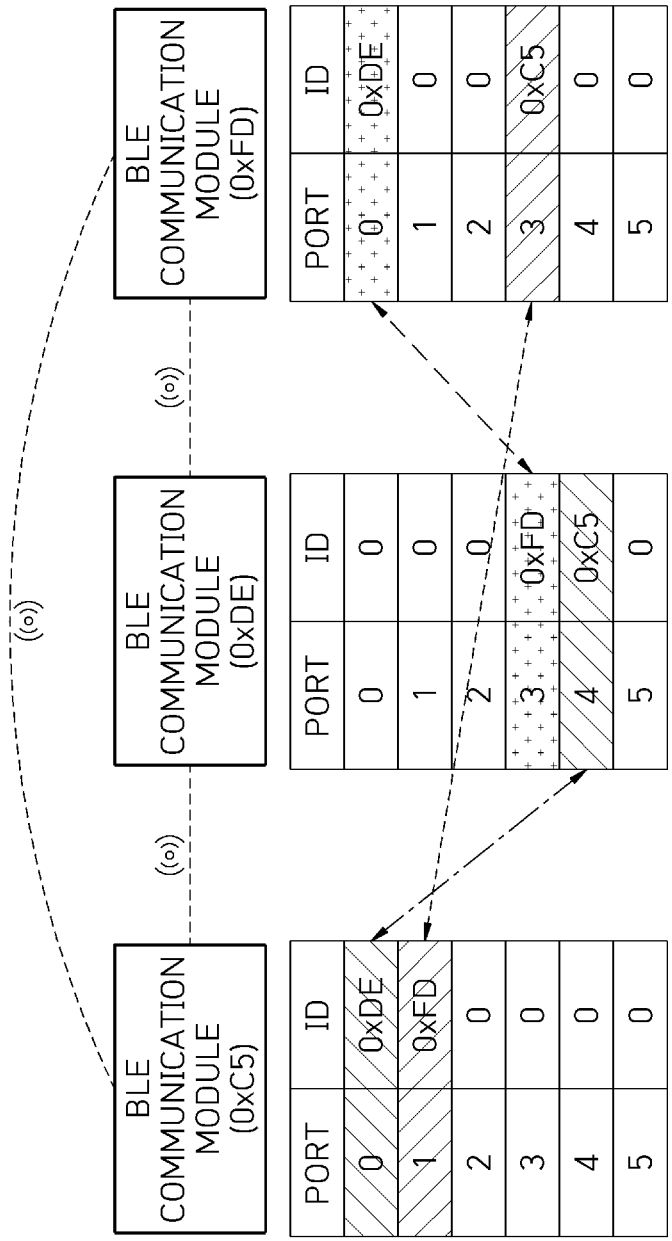
FIG. 6 is a diagram illustrating a configuration of a wireless ad hoc network constructed in a mesh form.

FIG. 6 is a diagram illustrating a configuration of a wireless ad hoc network constructed in a mesh form.

As an example, a BLE communication module has a master 110 and a slave 120, each of which has three ports. The master 110 is assigned to ports 0 to 2, and the slave 120 is assigned to ports 3 to 5.

At this time, a BLE communication module with an ID of 0xC5 has two master ports to which a BLE connection is made, and a BLE communication module with an ID of 0xDE has two slave ports to which a BLE connection is made. Also, a BLE communication module with an ID of 0xFD has one master port and one slave port to which a BLE connection is made.

As described above, the BLE communication module 100 may form a mesh-type wireless ad hoc network through at least two BLE connections.

Figure 7:
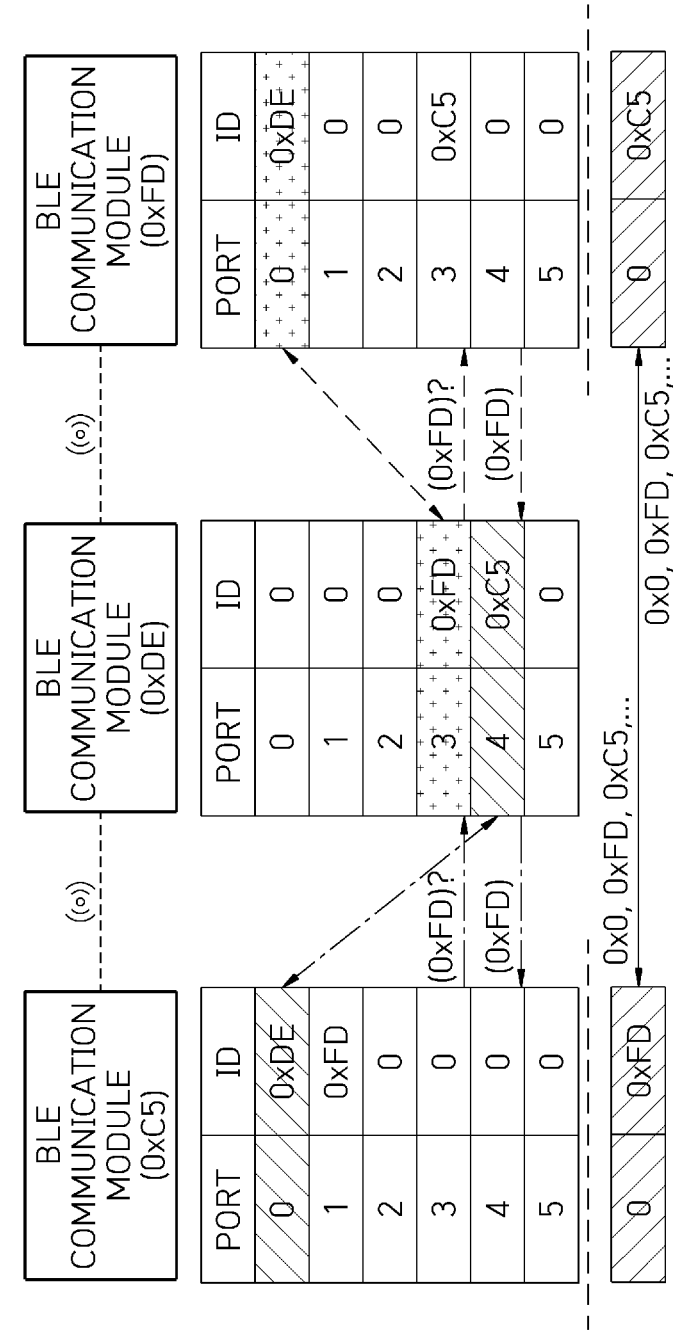
FIG. 7 is a diagram illustrating a configuration of a wireless ad hoc network constructed in an indirect form.

FIG. 7 is a diagram illustrating a configuration of a wireless ad hoc network constructed in an indirect form.

In FIG. 7, a BLE communication module with an ID of 0xC5 and a BLE communication module with an ID of 0xDE are directly connected to each other, the BLE communication module with the ID 0xDE and a BLE communication module with an ID of 0xFD are directly connected to each other, and the BLE communication module with the ID of 0xC5 and the BLE communication module with the ID of 0xFD are indirectly connected to each other through the BLE communication module with the ID of 0xDE.

In such a wireless ad hoc network structure, data transmission is attempted through a separate routing table.

In an example, when the BLE communication module with the ID of 0xC5 is intended to transmit data to a BLE communication module with a destination of 0xFD, the BLE communication module with the ID of 0xC5 confirms that there is no corresponding destination in the routing table and broadcasts a search message to discover the target ID (0xFD).

When the BLE communication module with the ID of 0xFD transmits a response message as a result of the broadcasting, the BLE communication module with the ID of 0xC5 registers the ID and the receiving port in the routing table as the port where the response message (source ID: 0xFD) is received. Accordingly, when data is transmitted to the corresponding port later, the BLE communication module with the ID of 0xDE transfers the data to the target BLE communication module (0xFD).

As described above, in an embodiment of the present invention, when there is no direct connection between BLE communication modules 100, data may be transmitted between the BLE communication modules 100 through an indirect connection.

Figure 8:
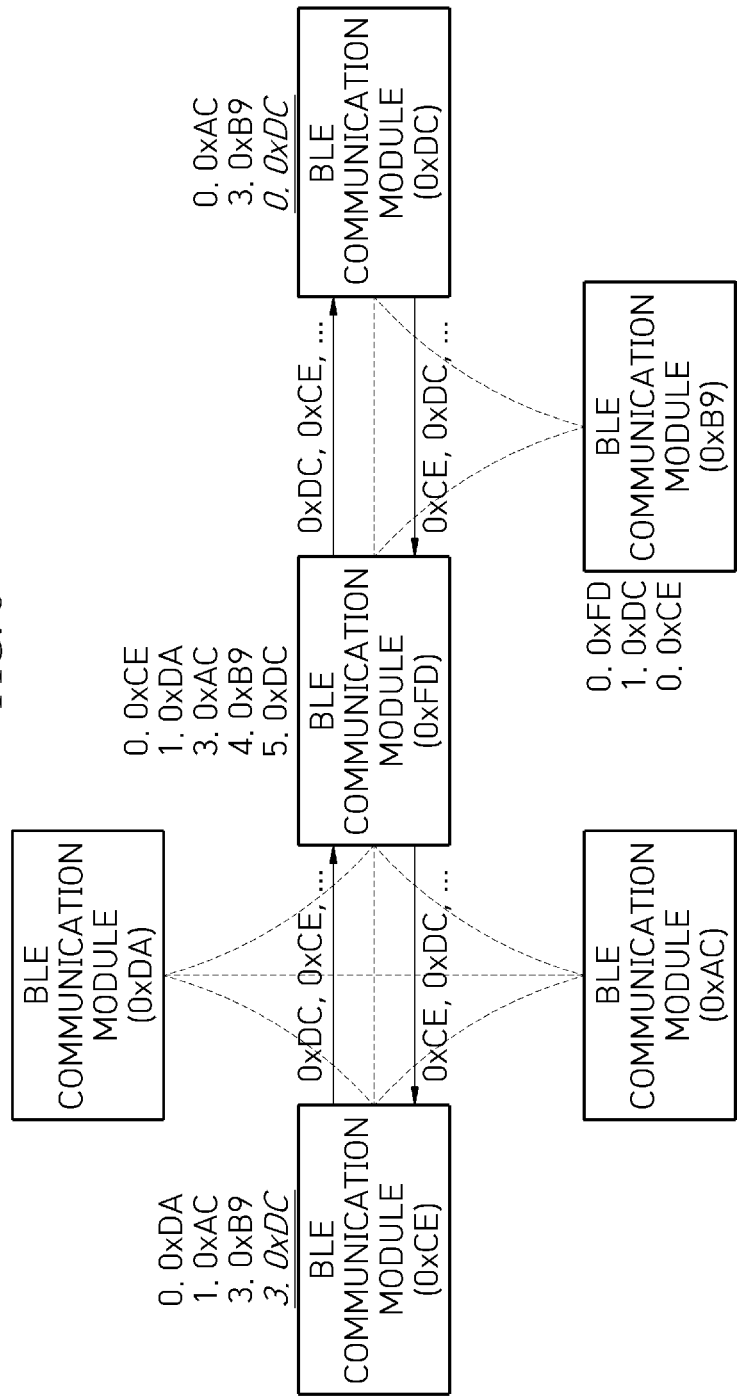
FIG. 8 is a diagram illustrating a configuration of a wireless ad hoc network expanded using a BLE communication module.

FIG. 8 is a diagram illustrating a configuration of a wireless ad hoc network expanded using a BLE communication module 100.

The wireless ad hoc network configuration according to an embodiment of the present invention has a dynamic structure in which the network configuration changes frequently due to the movement of an unmanned moving object. Whenever the wireless ad hoc network configuration changes, the corresponding port and the routing table may be updated.

Figure 9:
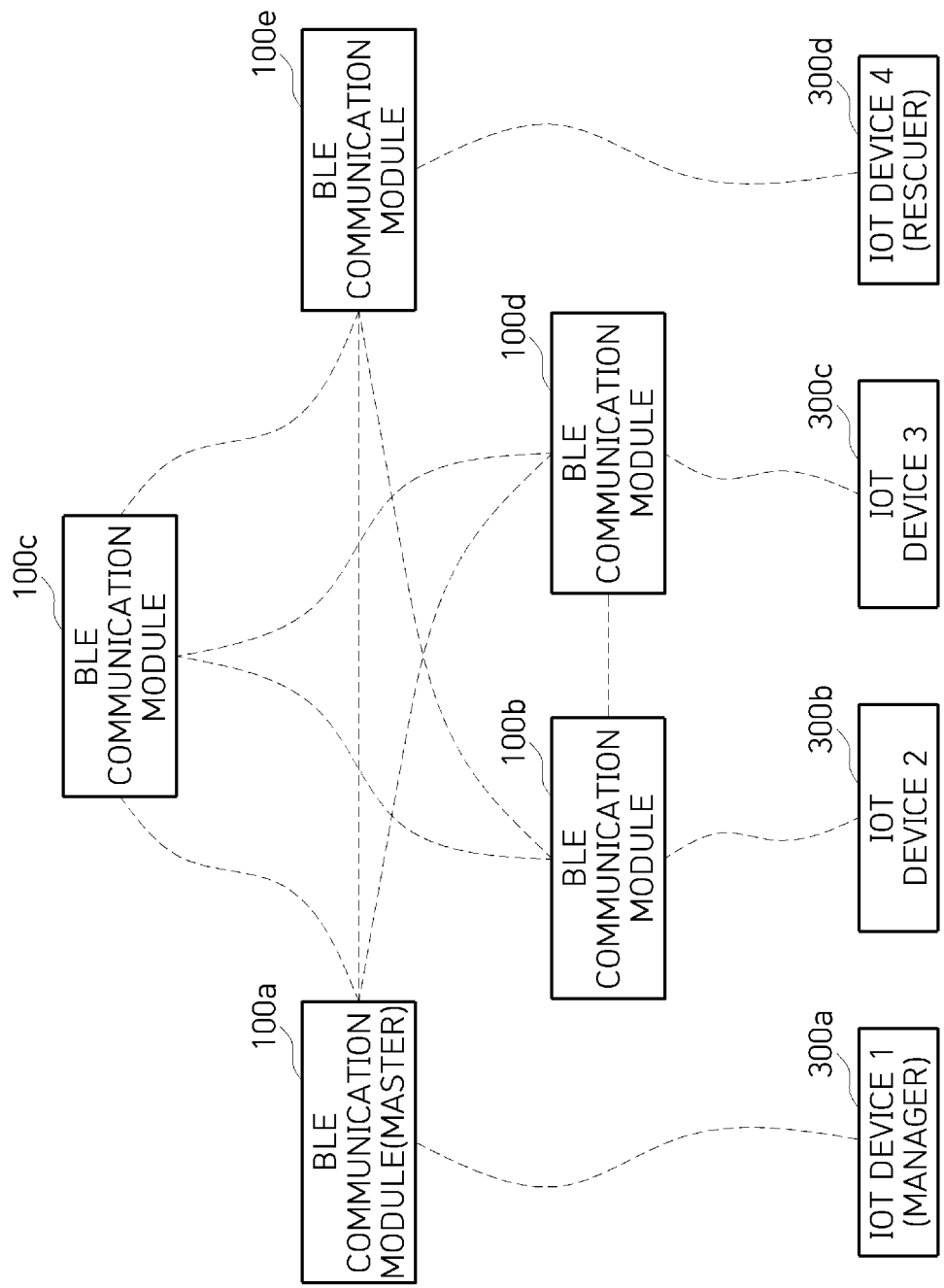
FIG. 9 is a diagram illustrating an example in which connection to various Internet-of-Things (IoT) devices is possible through a wireless ad hoc network of BLE communication modules.

FIG. 9 is a diagram illustrating an example in which connection to various IoT devices 300a to 300d is possible through a wireless ad hoc network of BLE communication modules 100a to 100e.

The BLE communication modules 100a to 100e have an integrated structure of master and slave functions and thus can be connected to various IoT devices 300a to 300d. It will be appreciated that it is possible to exchange data between the IoT devices 300a to 300d and control the IoT devices 300a to 300d.

Figure 10:
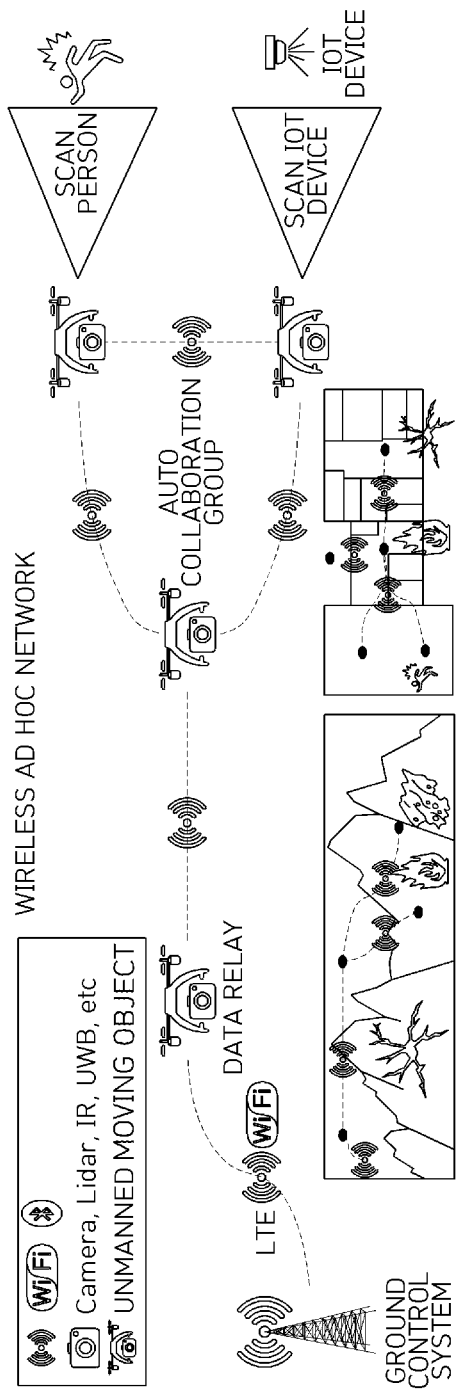
FIG. 10 is a diagram illustrating an example of configuring a dynamic ad hoc network using an unmanned moving object.

FIG. 10 is a diagram illustrating an example of configuring a dynamic ad hoc network using an unmanned moving object.

Meanwhile, the present invention provides an unmanned moving object that supports a dynamic multi-link for wireless ad hoc network configuration. In this case, the unmanned moving object has a feature of including the BLE communication module 100 that has been described with reference to FIGS. 1 to 9, and a repeated description thereof will be omitted.

The unmanned moving object includes a BLE communication module 100 including a master 110 and a slave 120 each having a predetermined multi-port and a routing table for processing transmitted or received data.

At this time, the master 110 scans an advertising message transmitted from the slave of another BLE communication module, and the slave 120 is connected to the master 110 through an internal interface and is configured to receive a scan message transmitted from the master of the other BLE communication module and transmit a corresponding advertising message.

According to an embodiment of the present invention, various wireless ad hoc network configurations are possible due to the movement of the unmanned moving object, and it is possible to share information obtained through each sensor of the unmanned moving object through a dynamic ad hoc network.

A method of configuring a wireless ad hoc network through a BLE communication module 100 that includes a master and a slave and supports a dynamic multi-link according to an embodiment of the present invention will be described below with reference to FIG. 11.

Figure 11:
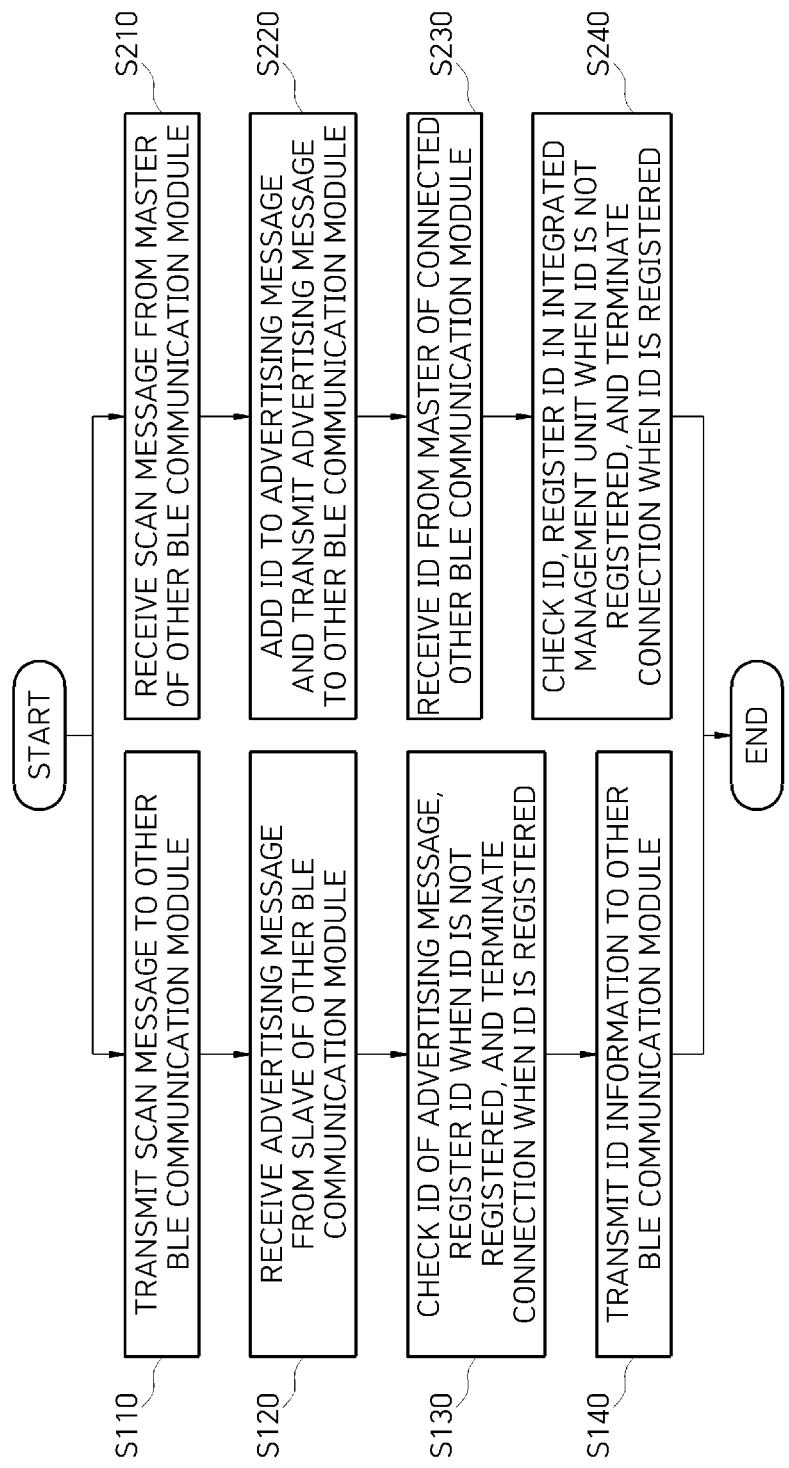
FIG. 11 is a flowchart of a wireless ad hoc network configuration method according to an embodiment of the present invention.

FIG. 11 is a flowchart of a wireless ad hoc network configuration method according to an embodiment of the present invention.

First, a master 110 transmits a scan message to another BLE communication module and scans an advertising message transmitted from the slave 120 of the other BLE communication module (S110).

Then, the master 110 receives the advertising message transmitted from the slave 120 of the other BLE communication module (S120) and checks the ID of the received advertising message. The master 110 registers the ID in the integrated management unit 130 when the ID is not registered and terminates the connection when the ID is already registered (S130).

Next, the master 110 transmits ID information of its own BLE communication module 100 to the other BLE communication module to register the ID information in the integrated management unit 130 of the other BLE communication module (S140).

Also, the slave 120 receives a scan message from the master 110 of the other BLE communication module (S210) and transmits an advertising message corresponding to the scan message to the other BLE communication module (S220).

Subsequently, the slave 120 receives an ID from the master 110 of the connected other BLE communication module (S230), checks the ID, registers the ID when the ID is not registered, and terminates the connection when the ID is registered (S240).

Meanwhile, in the above description, operations S110 to S240 may be subdivided into more operations or combined into fewer operations according to an implementation of the present invention. Also, some operations may be omitted if necessary, and the order of the operations may be changed. In addition, the contents of FIGS. 1 to 10 are also applied to the ad hoc network configuration method of FIG. 11 even if the contents are omitted.

In the military field and the disaster safety field in which there is no communication infrastructure because of various disasters such as fire, it is important for unmanned moving objects to complete missions such as reconnaissance or life discovery in cooperation with other unmanned moving objects within a short time. To this end, there is a need for communication between the unmanned moving objects. In addition, there is a need for an ad-hoc network that can acquire a great deal of information on a disaster situation using a communication function between an unmanned moving object and various peripheral IoT devices.

According to the above-described embodiment of the present invention, a dynamic ad-hoc network can be configured using the free movement of an unmanned moving object by providing a structure in which master and slave functions of a BLE communication module supporting a multi-link are integrated. Accordingly, it is possible to enable communication between unmanned moving objects and communication between an unmanned moving object and various peripheral IoT devices in a disaster situation with insufficient infrastructure, etc.

Advantageous effects of the present invention are not limited to the aforementioned effects, and other effects which are not mentioned here can be clearly understood by those skilled in the art from the following description.

The above-described method according to an embodiment of the present invention may be implemented as a program (or application) that can be executed in combination with a computer, which is hardware, and the program may be stored in a medium.

In order for the computer to read the program and execute the method implemented with the program, the program may include code of a computer language such as C, C++, JAVA, Ruby, and machine code which can be read by a processor (central processing unit (CPU)) of the computer through a device interface of the computer. Such code may include functional code associated with a function defining functions necessary to execute the methods and the like and may include control code associated with an execution procedure necessary for the processor of the computer to execute the functions according to a predetermined procedure. Also, such code may further include memory reference-related code indicating a position (an address number) of a memory inside or outside the computer at which additional information or media required for the processor of the computer to execute the functions should be referenced. Also, when the processor of the computer needs to communicate with any other computer or server in a remote location in order to execute the functions, the code may further include communication-related code for how to communicate with which computer or server in a remote location using a communication module of the computer, for what information or media to transmit or receive upon the communication, etc.

The storage medium refers not to a medium that temporarily stores images, such as a register, a cache, and a memory but to a medium that semi-permanently stores images and that is readable by a device. In detail, examples of the storage medium include read-only memory (ROM), random-access memory (RAM), CD-ROMs, magnetic tapes, floppy disks, optical image storage devices, etc., but the present invention is not limited thereto. That is, the program may be stored in various recording media on various servers accessible by the computer or in various recording media on a user's computer. Also, the medium can also be distributed over network-coupled computer systems so that the computer-readable code is stored in a distributed fashion.

The above description of the present invention is merely illustrative, and those skilled in the art should understand that various changes in form and details may be made therein without departing from the technical spirit or essential features of the invention. Therefore, the above embodiments are to be regarded as illustrative rather than restrictive. For example, each element described as a single element may be implemented in a distributed manner, and similarly, elements described as being distributed may also be implemented in a combined manner.

The scope of the present invention is shown by the following claims rather than the foregoing detailed description, and all changes or modifications derived from the meaning and scope of the claims and their equivalents should be construed as being included in the scope of the present invention.

What is claimed is:

1. A Bluetooth Low Energy (BLE) communication module in an unmanned moving object supporting a dynamic multi-link to configure a wireless ad hoc network for communication with another unmanned moving object and communication with a nearby Internet-of-Things (IoT) device, the BLE communication module comprising:

at least one processor, and memory having instructions stored thereon, which, when executed by the at least one processor, cause the at least one processor to perform:
a master configured to scan an advertising message transmitted from a slave of another BLE communication module in the other unmanned moving object and in the IoT device; and
a slave connected to the master through an internal interface and configured to receive a scan message transmitted from a master of the other BLE communication module and transmit an advertising message corresponding to the scan message,
wherein each of the master and the slave has a predetermined multi-port and a routing table for processing transmitted or received data,
wherein when data with a source ID corresponding to a first BLE communication module that is not directly connected to one of the multi-ports is received, the master and the slave register the corresponding port and the source ID of the first BLE communication module in the routing table, sequentially search for an ID of a second BLE communication module corresponding to a target ID and search the routing table whenever data is input, and transmit the data, and
the second BLE communication module is at least one other BLE communication module that is directly connected to one of the multi-ports and that is directly connected to the first BLE communication module.

2. The BLE communication module of claim 1, wherein when the slave receives a scan message transmitted from the master of the other BLE communication module, the slave transmits an advertising message including a name and ID information of the BLE communication module of the slave.

3. The BLE communication module of claim 1, wherein when the master receives an advertising message of the other BLE communication module through the scanning, the master performs management based on ID information included in the advertising message so that only one other BLE communication module remains connected per port.

4. The BLE communication module of claim 3, wherein when the other BLE communication module is connected to a specific port, the master registers ID information corresponding to the other BLE communication module in an integrated management unit and transmits ID information corresponding to the BLE communication module of the master to the other BLE communication module to register the ID information in an integrated management unit.

5. The BLE communication module of claim 4, wherein when a plurality of ports of the master or the slave are connected to the same other BLE communication module, a BLE communication module with a higher priority based on the ID information maintains a connection to only one port among redundant connections, and connections to the other ports are determined to be terminated.

6. The BLE communication module of claim 1, further comprising an integrated management unit provided in one of the master, the slave, and a separate processor and configured to control connection to the other BLE communication module through a multi-port of each of the master and the slave on the basis of a single ID.

7. The BLE communication module of claim 6, wherein the integrated management unit matches the multi-ports corresponding to the master and the slave to one virtual multi-port and outputs a result of the matching to the other BLE communication module and an higher-level application.

8. The BLE communication module of claim 1, wherein the master and the slave broadcast ID information to discover the first BLE communication module that is not directly connected, and when a corresponding response message is received from the first BLE communication module, the master and the slave update the routing table on the basis of a receiving port of the response message and source ID information.

9. An unmanned moving object supporting a dynamic multi-link to configure a wireless ad hoc network for communication with another unmanned moving object and communication with a nearby Internet-of-Things (IoT) device, the unmanned moving object comprising a Bluetooth Low Energy (BLE) communication module including one or more units being configured and executed by a processor using algorithm associated with a computer-readable storage medium, the one or more units comprising:
a master and a slave each having a predetermined multi-port and a routing table for processing transmitted or received data, wherein:
the master scans an advertising message transmitted from a slave of another BLE communication module in the other unmanned moving object and in the IoT device, and
the slave is connected to the master through an internal interface and configured to receive a scan message transmitted from a master of the other BLE communication module and transmit an advertising message corresponding to the scan message,
wherein when data with a source ID corresponding to a first BLE communication module that is not directly connected to one of the multi-ports is received, the master and the slave register the corresponding port and the source ID of the first BLE communication module in the routing table, sequentially search for an ID of a second BLE communication module corresponding to a target ID and search the routing table whenever data is input, and transmit the data, and
the second BLE communication module is at least one other BLE communication module that is directly connected to one of the multi-ports and that is directly connected to the first BLE communication module.

10. A method of configuring a wireless ad hoc network through a Bluetooth Low Energy (BLE) communication module in an unmanned moving object, the BLE communication module including a master and a slave and supporting a dynamic multi-link for communication with another unmanned moving object and communication with a nearby Internet-of-Things (IoT) device, the method comprising:
allowing the master to scan an advertising message transmitted from a slave of another BLE communication module in the other unmanned moving object and in the IoT device;
allowing the master to connect one other BLE communication module to each port on the basis of ID information included in the advertising message;
allowing the master to register ID information corresponding to the other BLE communication module in an integrated management unit when the other BLE communication module is connected to a specific port;
transmitting ID information of the BLE communication module corresponding to the master to the other BLE communication module and registering the ID information in the integrated management unit;
allowing the slave to receive a scan message from a master of the other BLE communication module; and allowing the slave to transmit an advertising message corresponding to the scan message to the other BLE communication module, wherein the master and the slave each have a predetermined multi-port and a routing table for processing transmitted or received data, and the method further comprising, when one of the master and the slave receives data with a source ID corresponding to a first BLE communication module that is not directly connected to one of the multi-ports:

registering the corresponding port and the source ID of the first BLE communication module in the routing table; and sequentially searching for an ID of a second BLE communication module corresponding to a target ID and searching the routing table whenever data is input and then transmitting the data, wherein the second BLE communication module is at least one other BLE communication module that is directly connected to one of the multi-ports and that is directly connected to the first BLE communication module.

11. The method of claim 10, wherein the allowing of the slave to transmit an advertising message corresponding to the scan message comprises transmitting an advertising message including a name and ID information of the BLE communication module corresponding to the slave to the other BLE communication module.

12. The method of claim 10, wherein when a plurality of ports of the master or the slave are connected to the same other BLE communication module, a BLE communication module with a higher priority based on the ID information maintains a connection to only one port among redundant connections, and connections to the other ports are determined to be terminated.

13. The method of claim 10, further comprising:

allowing one of the master and the slave to broadcast ID information to discover the first BLE communication module that is not directly connected to the BLE communication module;

receiving a corresponding response message from the first BLE communication module; and updating the routing table on the basis of a receiving port of the response message and source ID information of the first BLE communication module.

* * * * *